US012637600B2

(12) United States Patent
Miyamoto et al.

(10) Patent No.: US 12,637,600 B2
(45) Date of Patent: May 26, 2026

(54) PHOTOCURABLE COMPOSITION, CURED PRODUCT OF SAME, PHOTOFUSIBLE RESIN COMPOSITION AND ADHESIVE SET

(71) Applicant: Showa Denko Materials Co., Ltd., Tokyo (JP)

(72) Inventors: Yuki Miyamoto, Tokyo (JP); Masahito Watanabe, Tokyo (JP); Takashi Kumaki, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 671 days.

(21) Appl. No.: 17/926,667

(22) PCT Filed: Oct. 13, 2021

(86) PCT No.: PCT/JP2021/037866

§ 371 (c)(1),
(2) Date: Nov. 21, 2022

(87) PCT Pub. No.: WO2022/080405

PCT Pub. Date: Apr. 21, 2022

(65) Prior Publication Data

US 2023/0332026 A1 Oct. 19, 2023

(30) Foreign Application Priority Data

Oct. 14, 2020 (JP) ................................ 2020-173144

(51) Int. Cl.

| | |
|---|---|
| ***C09J 181/02*** | (2006.01) |
| ***C08G 75/045*** | (2016.01) |
| ***C09J 4/00*** | (2006.01) |
| ***C09J 11/06*** | (2006.01) |

(52) U.S. Cl.

CPC .......... *C09J 181/02* (2013.01); *C08G 75/045* (2013.01); *C09J 4/00* (2013.01); *C09J 11/06* (2013.01)

(58) Field of Classification Search

None

See application file for complete search history.

(56) References Cited

U.S. PATENT DOCUMENTS

| | | | | |
|---|---|---|---|---|
| 6,479,622 | B1 * | 11/2002 | Gross | C08G 75/045 525/204 |
| 6,605,687 | B1 * | 8/2003 | Gross | C08G 75/045 525/212 |
| 6,605,689 | B1 * | 8/2003 | Gross | C08G 75/045 525/212 |
| 6,605,690 | B1 * | 8/2003 | Gross | C08G 75/045 525/212 |
| 6,605,691 | B1 * | 8/2003 | Gross | C08G 75/12 525/212 |
| 6,605,692 | B1 * | 8/2003 | Gross | C08G 75/12 525/212 |
| 2008/0119620 | A1 * | 5/2008 | Kato | C08L 81/04 525/535 |
| 2019/0031931 | A1 * | 1/2019 | Kitayama | C09J 181/04 |

FOREIGN PATENT DOCUMENTS

| | | | | | |
|---|---|---|---|---|---|
| CN | 1788037 | A | * | 6/2006 | C08F 290/06 |
| CN | 102030880 | A | * | 4/2011 | C08G 18/3876 |
| CN | 102030902 | A | * | 4/2011 | C08G 18/755 |
| CN | 101437873 | B | * | 5/2011 | C08G 18/722 |
| CN | 101437874 | B | * | 9/2011 | C08G 18/758 |
| CN | 102030902 | B | * | 6/2014 | C08G 18/3876 |
| JP | H11-190883 | A | | 7/1999 | |
| JP | 2017-145276 | A | | 8/2017 | |
| JP | 2020-100795 | A | | 7/2020 | |
| WO | WO-2015029996 | A1 | * | 3/2015 | C09D 4/00 |
| WO | 2020/206220 | A1 | | 10/2020 | |

OTHER PUBLICATIONS

Allushi et al. Conventional Type II photoinitiators as activators for photoinduced metal-free atom transfer radical polymerization. Polymer Chemistry, 2017,8, 1972-1977 (Year: 2017).*

* cited by examiner

*Primary Examiner* — Sanza L. McClendon

(74) *Attorney, Agent, or Firm* — FITCH, EVEN. TABIN & FLANNERY, LLP

(57) ABSTRACT

Disclosed is a photocurable composition containing a dithiol compound having a disulfide bond, a compound having two ethylenically unsaturated groups, a hydrogen abstraction type photoradical generator, and an intramolecular cleavage type photoradical generator.

14 Claims, No Drawings

PHOTOCURABLE COMPOSITION, CURED PRODUCT OF SAME, PHOTOFUSIBLE RESIN COMPOSITION AND ADHESIVE SET

CROSS-REFERENCE TO RELATED APPLICATIONS

This application is a U.S. national phase application filed under 35 U.S.C. § 371 of International Application No PCT/JP2021/037866, filed Oct. 13, 2021, designating the United States, which claims priority from Japanese application No. 2020-173144, filed Oct. 14, 2020, which are incorporated herein by reference in their entireties.

TECHNICAL FIELD

The present disclosure relates to a photocurable composition, a cured product thereof, a photofusible resin composition, and an adhesive set.

BACKGROUND ART

Photosoftenable compositions that are softened by light irradiation have been used in various use applications. For example, Patent Literature 1 discloses an image forming device which includes a recording material having a photosoftenable resin composed of a photosoftenable resin composition.

CITATION LIST

Patent Literature

Patent Literature 1: Japanese Unexamined Patent Publication No. H11-190883

SUMMARY OF INVENTION

Technical Problem

In general adhesives and temporarily fixing materials, property control by heating such as adhesion by curing with heat, peeling by softening with heat, or peeling by melting with heat plasticization is general. However, in the property control by heating, a damage may be applied to a base material and a process operation time (takt time) may be lengthened in some cases. As for the temporarily fixing materials, since there are generally many film products, temporary fixing of a base material with a step height, or the like is difficult, there are many mechanisms utilizing shrinkage on curing, foaming, and a difference in coefficient of thermal expansion (CTE) also in the peeling mechanism, and a stress is generally applied to a base material. In the case of a composition that is cured by light and is fused by light, it is considered that the above-described inconveniences are difficult to occur.

An object of an aspect of the present invention is to provide a photocurable composition capable of forming a cured product that is fusible by light irradiation.

Solution to Problem

An aspect of the present invention relates to a photocurable composition containing a dithiol compound having a disulfide bond, a compound having two ethylenically unsaturated groups, a hydrogen abstraction type photoradical generator, and an intramolecular cleavage type photoradical generator.

Since this photocurable composition contains a dithiol compound having a disulfide bond, a compound having two ethylenically unsaturated groups, a hydrogen abstraction type photoradical generator, and an intramolecular cleavage type photoradical generator, a cured product that is fusible by light irradiation can be formed.

The mechanism of how such an effect is obtained is speculated, for example, as follows, but is not limited thereto. First, when the photocurable composition is irradiated with a first light, a reaction (thiol-ene reaction) between the dithiol compound having a disulfide bond and the compound having two ethylenically unsaturated groups proceeds by the hydrogen abstraction type photoradical generator. Thereby, a cured product of the photocurable composition containing the reaction product obtained by the thiol-ene reaction and the intramolecular cleavage type photoradical generator is formed. When the cured product of the photocurable composition is irradiated with a second light, the photo-cured product can be softened. The mechanism of how the photo-cured product can be softened is not clear, but for example, mechanisms as described below are considered. However, the mechanism of how the photo-cured product can be softened is not limited to these mechanisms. First, the disulfide bond in the photo-cured product is degraded (cleaved) by irradiation of the second light to generate a thiyl radical. At this time, when the intramolecular cleavage type photoradical generator is present in the photo-cured product, the thiyl radical and the photoradical generator are reacted to cap the thiyl radical with the photoradical generator. Thereby, a mechanism in which the molecular weight of the compound having a disulfide bond is decreased to soften the photo-cured product is considered. As another mechanism, a mechanism is also considered in which a photoinduced radical caused by the intramolecular cleavage type photoradical generator reacts directly with the disulfide bond, formation of a photoinduced radical-thioether bond and generation of a thiyl radical occur, the thiyl radical and another photoinduced radical are reacted, and the molecular weight of the compound having a disulfide bond itself is decreased to soften the photo-cured product. The first light includes light at a wavelength different from the second light. The first light may include light at a longer wavelength side than the second light. The first light may include light at a wavelength of 405 nm. The second light may include light at a wavelength of 365 nm. The reaction of cleaving the disulfide bond can be said to be an irreversible reaction.

The compound having two ethylenically unsaturated groups may be at least one compound selected from the group consisting of a compound having two allyl groups and a compound having two vinyloxy groups.

The hydrogen abstraction type photoradical generator may have an absorption coefficient at a wavelength of 405 nm of 7 or more. The intramolecular cleavage type photoradical generator may have an absorption coefficient at a wavelength of 405 nm of 5 or less and an absorption coefficient at a wavelength of 365 nm of 49 or more.

The hydrogen abstraction type photoradical generator may include at least one selected from the group consisting of fluorenone and benzil. The intramolecular cleavage type photoradical generator may include one selected from the group consisting of 2,2-dimethoxy-1,2-diphenylethan-1-one and 2-hydroxy-2-methyl-1-phenylpropanone. The photocurable composition may be an adhesive.

Another aspect of the present invention relates to a cured product of the above-described photocurable composition. Still another aspect of the present invention relates to a photofusible resin composition containing a reaction product of a dithiol compound having a disulfide bond and a compound having two ethylenically unsaturated groups, and an intramolecular cleavage type photoradical generator.

Still another aspect of the present invention relates to an adhesive set including a first component containing a dithiol compound having a disulfide bond and a second component containing a compound having two ethylenically unsaturated group, in which at least one of the first component and the second component further contains a hydrogen abstraction type photoradical generator, and at least one of the first component and the second component further contains an intramolecular cleavage type photoradical generator.

Advantageous Effects of Invention

According to an aspect of the present invention, there is provided a photocurable composition capable of forming a cured product that is fusible by light irradiation. According to an aspect of the present invention, there are provided a cured product of the above-described photocurable composition, and a photofusible resin composition and an adhesive set that use the above-described photocurable composition.

DESCRIPTION OF EMBODIMENTS

Hereinafter, embodiments of the present invention will be described in detail. However, the present invention is not limited to the following embodiments.

In the present specification, the term "step" includes not only an independent step but also a step by which an intended action of the step is achieved, even though the step cannot be clearly distinguished from other steps. Furthermore, a numerical range that has been indicated by use of "to" indicates the range that includes the numerical values which are described before and after "to", as the minimum value and the maximum value, respectively.

Furthermore, in the present specification, when a plurality of substances corresponding to each component exist in the composition, the content of each component in the composition means the total amount of the plurality of substances that exist in the composition, unless otherwise specified. Furthermore, listed materials may be used singly or in combinations of two or more kinds, unless otherwise specified.

Furthermore, in the numerical ranges that are described stepwise in the present specification, the upper limit value or the lower limit value of the numerical range of a certain stage may be replaced with the upper limit value or the lower limit value of the numerical range of another stage. Furthermore, in a numerical range described in the present specification, the upper limit value or the lower limit value of the numerical range may be replaced with a value shown in the Examples. "A or B" may include either one of A and B, and may also include both of A and B.

[Photocurable Composition]

A photocurable composition of an embodiment contains a dithiol compound having a disulfide bond (hereinafter, referred to as the component (A-1) in some cases), a compound having two ethylenically unsaturated groups (hereinafter, referred to as the component (A-2) in some cases), a hydrogen abstraction type photoradical generator (hereinafter, referred to as the component (B-1) in some cases), and an intramolecular cleavage type photoradical generator (hereinafter, referred to as the component (B-2) in some cases).

Component (A-1): Dithiol Compound Having Disulfide Bond

The component (A-1) is a compound having a disulfide bond (—S—S—) and having two thiol groups (—SH). The component (A-1) may be a high-molecular-weight component of a polymer or an oligomer. The component (A-1) can also be a compound including two thiol groups and a disulfide bond and composed of a group (first linking group) linking the two thiol groups.

The molecular weight or weight average molecular weight of the component (A-1) may be 200 to 10000000, 200 to 3000000, 500 to 1000000, or 1000 to 10000. Note that, the weight average molecular weight is a value in terms of polystyrene using a calibration curve based on standard polystyrene by gel permeation chromatography (GPC).

The component (A-1) has one or a plurality of (two or more) disulfide bonds in the molecule. The number of disulfide bonds in the component (A-1) may be, for example, 1 to 1000 or 4 to 50.

The component (A-1) may be a compound (for example, a polymer or an oligomer) having a linear molecular chain and a terminal group and having a disulfide bond in the molecular chain. In this case, the terminal group in the component (A-1) may be a thiol group. In a case where the component (A-1) is such a compound, a cured product having an excellent photofusible property can be more easily formed. The molecular chain in the component (A-1) may include a disulfide bond and a polyether chain, and may be composed of a disulfide bond and a polyether chain.

The component (A-1) may be, for example, a compound (compound (1)) represented by Formula (1): $HS\text{-}(A\text{-}S—S)_{n1}\text{-}A\text{-}SH$ or a compound in which the chain of the compound (1) is extended. In the formula, "A" represents a polyether chain. A plurality of A's may be the same as or different from each other. "n1" represents an integer of 1 or more. "n1" may be, for example, 1 or more or 4 or more, and may be 1000 or less. In a case where the component (A-1) is the compound represented by Formula (1), a group represented by $\text{-}(A\text{-}S—S)_{n1}\text{-}A\text{-}$ is the first linking group. The compound in which the chain of the compound (1) is extended may be, for example, a Michael adduct of the compound (1) or a thiourethanated product of the compound (1). The Michael adduct of the compound (1) as the component (A-1) may be a reaction product of a compound (for example, diacrylate) having a group (for example, an acryloyl group) reacting with a thiol group so that a bond can be formed by Michael addition reaction and the compound (1), the reaction product being a compound having two thiol groups. The thiourethanated product of the compound (1) as the component (A-1) is a reaction product of diisocyanate and the compound (1), the reaction product being a compound having two thiol groups.

The polyether chain as "A" may be, for example, a polyoxyalkylene chain. The polyether chain as "A" may be, for example, a group represented by $\text{-}A^1\text{-}O\text{-}A^2\text{-}O\text{-}A^3\text{-}$. $A^1$ to $A^3$ each independently may be an alkylene group, and may be an alkylene group having 1 to 2 carbon atoms (for example, a methylene group or an ethylene group). Examples of the polyether chain as "A" include $—CH_2CH_2—O—CH_2—O—CH_2CH_2—$.

Examples of commercially available products of the component (A-1) include THIOKOL LP series (dithiol having a disulfide bond, manufactured by TORAY FINE CHEMICALS CO., LTD.). The component (A-1) may be used singly or may be used in combination of two or more kinds thereof. The component (A-1) can also be obtained by converting a reactive functional group of a compound having a reactive functional group (for example, a carboxy group or a hydroxy group) and a disulfide bond at the terminal into a thiol group. Examples of the compound having a reactive functional group and a disulfide bond at the terminal include 3,3'-dithiodipropionic acid (manufactured by Tokyo Chemical Industry Co., Ltd.), dithiodiethanol, and cystamine.

The content of the component (A-1) may be 50% by mass or more, 60% by mass or more, 70% by mass or more, 75% by mass or more, or 80% by mass or more, and may be 95% by mass or less, 90% by mass or less, or 85% by mass or less, on the basis of the total mass of the photocurable composition.

Component (A-2): Compound Having Two Ethylenically Unsaturated Groups

The component (A-2) is a compound having two ethylenically unsaturated groups (C═C) in the molecule. The component (A-2) can also be a compound composed of two ethylenically unsaturated groups and a group (second linking group) linking the two ethylenically unsaturated groups.

The second linking group is a group capable of linking two ethylenically unsaturated groups, and may be, for example, a substituted or unsubstituted bivalent hydrocarbon group. Examples of the hydrocarbon group include a bivalent aromatic group such as a phenylene group, and an alkylene group. The substituted hydrocarbon group may be a group composed of the above-described hydrocarbon group and a group including an oxygen atom. Examples of the group including an oxygen atom include an oxy group (—O—) and an ester group (—O—C(═O)—). The group including an oxygen atom may be a polyoxyalkylene group such as a polyoxyethylene group.

The component (A-2) may be, for example, a compound having two groups selected from the group consisting of an allyl group ($H_2C$═CH—$CH_2$—), a vinyloxy group ($H_2C$═CH—O—), and a (meth)acryloyl group. From the viewpoint of further improving photo-curability, the viewpoint of further easily liquefying a cured product by light irradiation, and the like, the component (A-2) may include a compound having two groups selected from the group consisting of an allyl group and a vinyloxy group. The component (A-2) may include a compound having two allyl groups or a compound having two vinyloxy groups. From the viewpoint of further excellent curability, the compound having two ethylenically unsaturated groups may include, for example, a compound having two vinyloxy groups. The (meth)acryloyl group is a methacryloyl group or an acryloyl group.

Examples of the component (A-2) include diallyl terephthalate, triethylene glycol divinyl ether, 1,4-cyclohexane dimethanol divinyl ether, diethylene glycol divinyl ether, and 1,4-butanediol divinyl ether. The component (A-2) may be used singly or may be used in combination of two or more kinds thereof.

The content of the component (A-2) may be 1.0% by mass or more, 2.0% by mass or more, 3.0% by mass or more, 3.5% by mass or more, or 4.0% by mass or more, and may be 30% by mass or less, 20.0% by mass or less, 10.0% by mass or less, or 5.0% by mass or less, on the basis of the total mass of the photocurable composition.

The molar ratio (the component (A-1)/the component (A-2)) of the component (A-1) with respect to the component (A-2) may be, for example, 0.8 to 1.2, 0.9 to 1.1, or 0.98 to 1.02.

Component (B-1): Hydrogen Abstraction Type Photoradical Generator

The component (B-1) is a compound that extracts hydrogen from another molecule by irradiation of light to generate a radical. As the component (B-1), a compound used as a hydrogen abstraction type photoradical polymerization initiator can be used.

Examples of the component (B-1) include a hexaarylbisimidazole (HABI) compound, a benzophenone compound, a thioxanthone compound, a fluorenone compound, and an α-diketone compound. The component (B-1) may be used singly or may be used in combination of two or more kinds thereof.

Examples of the HABI compound include 2,2'-bis(o-chlorophenyl)-4,4',5,5'-tetraphenyl biimidazole (for example, 2,2'-bis(2-chlorophenyl)-4,4',5,5'-tetraphenyl-1,2'-biimidazole), 2,2'-bis(o-bromophenyl)-4,4',5,5'-tetraphenyl biimidazole, 2,2'-bis(o,p-dichlorophenyl)-4,4',5,5'-tetraphenyl biimidazole, 2,2'-bis(o-chlorophenyl)-4,4',5,5'-tetra(m-methoxyphenyl)biimidazole, 2,2'-bis(o, o'-dichlorophenyl)-4,4',5,5'-tetraphenyl biimidazole, 2,2'-bis(o-nitrophenyl)-4,4',5,5'-tetraphenyl biimidazole, and 2,2'-bis(o-methylphenyl)-4,4',5,5'-tetraphenyl biimidazole.

Examples of the benzophenone compound include 4,4'-bis(dimethylamino)benzophenone and 4,4'-bis(diethylamino)benzophenone.

Examples of the thioxanthone compound include thioxanthone, 2-isopropylthioxanthone, 2-dodecylthioxanthone, 2-cyclohexylthioxanthone, 2,4-diethylthioxanthone, 2,4-dimethylthioxanthone, 1-phenoxythioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 3,4-di-[2-(2-methoxyethoxy)-ethoxycarbonyl]-thioxanthone, 2-chlorothioxanthone, 1-ethoxycarbonyl-3-ethoxythioxanthone, 1-ethoxycarbonyl-3-chlorothioxanthone, 1-chloro-4-n-propoxythioxanthone, 2-methyl-6-dimethoxymethyl-thioxanthone, 2-methyl-6-(1,1-dimethoxybenzyl)-thioxanthone, 6-ethoxycarbonyl-2-methoxy-thioxanthone, 6-ethoxycarbonyl-2-methylthioxanthone, 1-ethoxycarbonyl-3-(1-methyl-1-morpholinoethyl)-thioxanthone, 2-morpholinomethylthioxanthone, 2-methyl-6-morpholinomethylthioxanthone, and thioxanthone-2-carboxylic acid polyethylene glycol ester.

Examples of the fluorenone compound include 9-fluorenone, 3,4-benzo-9-fluorenone, 2-dimethylamino-9-fluorenone, 2-methoxy-9-fluorenone, 2-chloro-9-fluorenone, 2,7-dichloro-9-fluorenone, 2-bromo-9-fluorenone, 2,7-dibromo-9-fluorenone, 2-nitro-9-fluorenone, and 2-acetoxy-9-fluorenone.

Examples of the α-diketone compound include a benzil (also referred to as diphenylethanedione or dibenzoyl) compound.

The component (B-1) may be, for example, a compound that absorbs light at a wavelength of 405 nm. The component (B-1) may be a compound having an absorption coefficient at a wavelength of 405 nm larger than that of the component (B-2).

The absorption coefficient at a wavelength of 405 nm of the component (B-1) may be 7 or more. In a case where the absorption coefficient at a wavelength of 405 nm of the component (B-1) is in the above range, the effect of the present invention is more significantly exhibited.

In the present specification, the absorption coefficients of Omnirad TPO (2,4,6-trimethylbenzoyl-diphenyl-phosphine oxide), Omnirad 754, and Omnirad MBF are values as measured in acetonitrile, and the absorption coefficients of other compounds are values (unit: mL/g·cm) as measured in methanol.

Examples of the component (B-1) having an absorption coefficient at a wavelength of 405 nm of 7 or more include 2,2'-bis(o-chlorophenyl)-4,4',5,5'-tetraphenyl biimidazole and 9-fluorenone.

The content of the component (B-1) may be 0.5 parts by mass or more, 1.5 parts by mass or more, 3 parts by mass or more, or 4 parts by mass or more, with respect to 100 parts by mass of the photocurable composition. The content of the component (B-1) may be 20 parts by mass or less, 15 parts by mass or less, 10 parts by mass or less, or 7 parts by mass or less, with respect to 100 parts by mass of the photocurable composition.

Component (B-2): Intramolecular Cleavage Type Photoradical Generator

The component (B-2) is a compound that photo-cleaves itself by irradiation of light to generate two radicals. As the component (B-2), a compound used as an intramolecular cleavage type photoradical polymerization initiator can be used.

Examples of the intramolecular cleavage type photoradical generator include a benzyl ketal-based photoradical generator, an α-aminoalkyl phenone-based photoradical generator, an α-hydroxyalkyl phenone-based photoradical generator, an α-hydroxy acetophenone-based photoradical generator, and an acylphosphine oxide-based photoradical generator. The component (B-2) may be used singly or may be used in combination of two or more kinds thereof.

Examples of the benzyl ketal-based photoradical generator include 2,2-dimethoxy-1,2-diphenylethan-1-one (Omnirad 651).

Examples of the α-aminoalkyl phenone-based photoradical generator include 2-benzyl-2-dimethylamino-1-(4-morpholinophenyl)-butanone-1 (Omnirad 369), 2-methyl-1-[4-(methylthio)phenyl]-2-morpholinopropan-1-one (Omnirad 907), and 2-dimethylamino-2-(4-methyl-benzyl)-1-(4-morpholine-4-yl-phenyl)-butan-1-one (Omnirad 379EG).

Examples of the α-hydroxyalkyl phenone-based photoradical generator include 1-hydroxy-cyclohexyl-phenyl-ketone (Omnirad 184).

Examples of the α-hydroxy acetophenone-based photoradical generator include 2-hydroxy-1-{4-[4-(2-hydroxy-2-methyl-propionyl)-benzyl]-phenyl}-2-methyl-propan-1-one (Omnirad 127) and 2-hydroxy-2-methyl-1-phenyl-propan-1-one (Omnirad 1173).

Examples of the acylphosphine oxide-based photoradical generator include 2,4,6-trimethylbenzoyl-diphenyl-phosphine oxide (Omnirad TPO H) and bis(2,4,6-trimethylbenzoyl)-phenylphosphine oxide (Omnirad 819).

The component (B-2) may be a compound that absorbs light at a wavelength of 365 nm and does not substantially absorb light at a wavelength of 405 nm or has an absorption coefficient at a wavelength of 405 nm smaller than that of the component (B-1). The absorption coefficient at a wavelength of 365 nm of the component (B-2) may be 49 or more. In the present specification, the expression "does not substantially absorb light at a wavelength of 405 nm" means that the absorption coefficient at a wavelength of 405 nm is 5 or less. The component (B-2) may be a compound having an absorption coefficient at a wavelength of 365 nm of 49 or more and an absorption coefficient at a wavelength of 405 nm of 5 or less. In a case where the absorption coefficient at a wavelength of 405 nm and the absorption coefficient at a wavelength of 365 nm of the component (B-2) are in the above ranges, the effect of the present invention is more significantly exhibited.

Examples of the component (B-2) having an absorption coefficient at a wavelength of 365 nm of 49 or more and an absorption coefficient at a wavelength of 405 nm of 5 or less include Omnirad 651, Omnirad 1173, and Omnirad 184.

The content of the component (B-2) may be 1 part by mass or more, 3 parts by mass or more, 5 parts by mass or more, 10 parts by mass or more, 15 parts by mass or more, or 25 parts by mass or more, with respect to 100 parts by mass of the photocurable composition. The content of the component (B-2) may be 50 parts by mass or less, 40 parts by mass or less, 35 parts by mass or less, or 30 parts by mass or less, with respect to 100 parts by mass of the photocurable composition.

A combination of the component (B-1) and the component (B-2) may be a combination of fluorenone and 2,2-dimethoxy-1,2-diphenylethan-1-one, a combination of benzil and 2-hydroxy-2-methyl-1-phenylpropanone, a combination of benzil and 2,2-dimethoxy-1,2-diphenylethan-1-one, or a combination of benzil and 1-hydroxy-cyclohexyl-phenyl-ketone.

In the photocurable composition, the hydrogen abstraction type photoradical generator may include at least one selected from the group consisting of fluorenone and benzil, and the intramolecular cleavage type photoradical generator may include one selected from the group consisting of 2,2-dimethoxy-1,2-diphenylethan-1-one and 2-hydroxy-2-methyl-1-phenylpropanone.

The photocurable composition may further contain other components other than the component (A-1), the component (A-2), the component (B-1), and the component (B-2). Examples of the other components include additives such as a plasticizer, an adhesion-imparting agent such as a tackifier, an antioxidant, a leuco dye, a sensitizer, an adhesion improver such as a coupling agent, a polymerization inhibitor, a light stabilizer, a defoaming agent, a filler, a chain transfer agent, a thixotropy-imparting agent, a flame retarder, a mold-releasing agent, a surfactant, a lubricant, and an antistatic agent. As these additives, known additives can be used. The total amount of the contents of the other components may be 0 to 95% by mass, 0.01 to 50% by mass, or 0.1 to 10% by mass, on the basis of the total amount of the photocurable composition.

The photocurable composition may be used as a varnish of the photocurable composition diluted with a solvent. Examples of the solvent component include aromatic hydrocarbons such as toluene, xylene, mesitylene, cumene, and p-cymene; aliphatic hydrocarbons such as hexane and heptane; cyclic alkanes such as methylcyclohexane; cyclic ethers such as tetrahydrofuran and 1,4-dioxane; ketones such as acetone, methyl ethyl ketone, methyl isobutyl ketone, cyclohexanone, and 4-hydroxy-4-methyl-2-pentanone; esters such as methyl acetate, ethyl acetate, butyl acetate, methyl lactate, ethyl lactate, and γ-butyrolactone; carbonic esters such as ethylene carbonate and propylene carbonate; and amides such as N,N-dimethylformamide, N,N-dimethylacetamide, and N-methyl-2-pyrrolidone (NMP). A component (E) may be used singly or in combination of two or more types thereof. The content of the solid content in the varnish, that is, the total content of components other than the solvent in the varnish may be 10 to 95% by mass, 15 to 70% by mass, or 20 to 50% by mass, on the basis of the total mass of the varnish.

The photocurable composition can be prepared, for example, by a method including a step of mixing or kneading the component (A-1), the component (A-2), the component (B-1), the component (B-2), a component (A-3), and a component to be added as necessary. Mixing and kneading can be performed by appropriately combining a general stirrer, a mortar machine, and a disperser such as a triple roll mill, a ball mill, and a bead mill The photocurable composition can form a cured product by light irradiation. A thiol-ene reaction between the component (A-1) and the component (A-2) proceeds by light irradiation of the photocurable composition. The thiol-ene reaction proceeds as a starting point at which the hydrogen abstraction type photoradical generator extracts the hydrogen of the thiol group in the component (A-1) at the time of light irradiation. The reaction product of the component (A-1) and the component (A-2) includes, for example, a compound represented by the following formula. The cured product contains the reaction product of the component (A-1) and the component (A-2) and the intramolecular cleavage type photoradical generator.

[Chemical Formula 1]

$$* -\!\!\left[ S-X-S-CH_2-CH_2-Y-CH_2-CH_2 \right]_m\!\!- *$$

In the formula, X represents the first linking group and Y represents the second linking group. "m" represents an integer of 1 or more. "m" may be, for example, 25 or more, 50 or more, 100 or more, or 250 or more.

For example, the cured product of the photocurable composition can be formed by irradiating the photocurable composition with the first light including light at a wavelength of 405 nm. The exposure dose of the first light may be, for example, 20000 $mJ/cm^2$ or more. In the present specification, the exposure dose means a product of illumination and an irradiation time (sec). The irradiation of light may be performed directly with respect to an object to be irradiated, and may be performed through glass or the like. A light source used for light irradiation is not particularly limited, and examples thereof include an LED lamp, a mercury lamp (such as a low-pressure, high-pressure, or super high-pressure mercury lamp), a metal halide lamp, an excimer lamp, and a xenon lamp, and an LED lamp, a mercury lamp, a metal halide lamp, and the like are preferred.

The cured product of the photocurable composition can be formed in various forms. For example, a cured product formed in a membrane shape (film shape) can be used as a resin film. A cured product formed in a block shape can be used as a resin block. A method of forming a membrane-shaped (film-shaped) or block-shaped cured product is not particularly limited, and a known method can be applied.

The storage elastic modulus at 25° C. of the cured product of the photocurable composition may be 5000 Pa or more, 7000 Pa or more, or 100000 Pa or more. The storage elastic modulus at 25° C. of the cured product of the photocurable composition is not particularly limited, and may be, for example, 1000 MPa or less. In the present specification, the storage elastic modulus at 25° C. means a value as measured by a method described in Examples.

The cured product has a property of being photo-fused by light irradiation. For example, the cured product can be fused by irradiation of the second light including light at a wavelength of 365 nm. The exposure dose of the second light may be, for example, 5000 $mJ/cm^2$ or more. The irradiation of light may be performed directly with respect to an object to be irradiated, and may be performed through glass or the like. A light source or the like at the time of light irradiation may be the same as described above.

The intramolecular cleavage type photoradical generator cleaves the disulfide bond (—S—S—) in the reaction product of the component (A-1) and the component (A-2) at the time of light irradiation. Thereby, the molecular weight of the reaction product of the component (A-1) and the component (A-2) is decreased so that the cured product becomes a liquid (liquid form). Since the cured product of the photocurable composition described above is fused by light irradiation, the cured product can also be called a photofusible composition. This photofusible composition contains the reaction product of the component (A-1) and the component (A-2) and the intramolecular cleavage type photoradical generator.

The storage elastic modulus at 25° C. of the cured product of the photocurable composition after light irradiation may be 100 Pa or less, 10 Pa or less, or 8.5 Pa or less. The storage elastic modulus at 25° C. of the cured product of the photocurable composition is not particularly limited, and may be, for example, more than 0 MPa.

The photocurable composition of the present embodiment can be used for use applications such as an adhesive, a temporarily fixing material, a photoresist, a resin for a 3D printer, and a resin for a molding material.

An adhesive set of the present embodiment includes a first component containing a dithiol compound (component (A-1)) having a disulfide bond and a second component containing a compound (component (A-2)) having two ethylenically unsaturated groups. At least one of the first component and the second component further contains a hydrogen abstraction type photoradical generator (component (B-1)), and at least of the first component and the second component further contains an intramolecular cleavage type photoradical generator (component (B-2)). At least one of the first component and the second component may further contain other components described above.

When the first component and the second component are mixed, the equivalent ratio (molar ratio) of the component (A-1) with respect to the component (A-2) may be, for example, 0.8 to 1.2.

In the adhesive set of the present embodiment, an adhesive composition can be prepared by mixing the first component and the second component. The temperature and time when the first component and the second component are mixed may be, for example, 10 to 35° C. and 0.1 to 60 minutes.

Examples of the method of mixing the first component and the second component include a manual mixing method using a spatula or the like, a mixing method with hand painting using a usual caulking gun, and a mixing method using a mechanical rotary mixer, a static mixer, or the like while concurrently using a quantitative pump for feeding a raw material (for example, a gear pump, a plunger pump, or the like) and a throttle valve.

The prepared adhesive composition can form a cured product of the adhesive composition by light irradiation, and can act as an adhesive layer bonding adherends to each other. For example, the adhesive composition can be cured by irradiation of light including light at a wavelength of 405 nm.

The adhesive composition including the first component and the second component has adhesiveness, and the cured product of the adhesive composition has a photofusible property by light irradiation. Therefore, the adhesive composition can also be used as an adhesive having repairability.

An adhesive body of an embodiment includes a first adherend, a second adherend, and an adhesive layer bonding the first adherend and the second adherend to each other. The adhesive layer contains the cured product of the photocurable composition.

Examples of the first adherend and the second adherend include plastics such as a polyolefin resin, a polyamide resin, ABS, PC, PET, PPS, and an acrylic resin, wood materials, rubbers, and inorganic materials such as iron steel, stainless steel, aluminum, copper, nickel, chromium, or an alloy thereof, glass, and a silicon wafer.

The adhesive body includes a step of pasting the first adherend and the second adherend to each other through the photocurable composition. The curing conditions and the like may be the same as described above.

A method of separating the adherends of an embodiment includes a step of separating the first adherend and the second adherend from each other by irradiating the adhesive layer of the adhesive body with light. Since the adhesive layer contains the cured product of the photocurable composition described above, the cured product of the photocurable composition is fused by light irradiation so that the adherends can be easily separated from each other.

In the method of separating the adherends, the type of light, the light source, and the like at the time of light irradiation may be the same as described above.

EXAMPLES

Hereinafter, the present invention will be more specifically described by means of Examples. However, the present invention is not limited to these Examples.

Compounds described below were prepared.

Component (A-1):

THIOKOL LP-55 (a dithiol compound having a disulfide bond, manufactured by TORAY FINE CHEMICALS CO., LTD.)

Component (A-2):

Diallyl terephthalate (the number of allyl groups: 2, manufactured by Tokyo Chemical Industry Co., Ltd.)

Triethylene glycol divinyl ether (the number of vinyl ether groups: 2, manufactured by Tokyo Chemical Industry Co., Ltd.)

Component (B-1):

Fluorenone (manufactured by FUJIFILM Wako Pure Chemical Corporation)

Benzil (manufactured by FUJIFILM Wako Pure Chemical Corporation)

Component (B-2):

2,2-Dimethoxy-1,2-diphenylethan-1-one (manufactured by IGM Resins B.V., trade name: Omnirad 651)

2-Hydroxy-2-methyl-1-phenylpropanone (manufactured by IGM Resins B.V., trade name: Omnirad 1173)

[Preparation of Photopolymerizable Compound]

To a 125 ml ointment jar, the component (A-1), the component (A-2), the component (B-1), and the component (B-2) of components and amounts (unit: parts by mass) described in Table 1 were added and mixed for 3 minutes using a rotary and revolutionary stifling machine (manufactured by THINKY CORPORATION, trade name: THINKY MIXER ARE-310) at 2000 rpm. Next, after the ointment jar was heated with a box-shaped drier at 90° C. for 1 hour, mixing was performed again for 3 minutes using the rotary and revolutionary stirring machine at 2000 rpm, thereby obtaining a photocurable composition.

An evaluation sample was irradiated with ultraviolet light from a light transmissive bottom surface using a viscoelasticity measuring instrument (manufactured by TA Instruments, trade name: DHR-2), thereby measuring a change in storage elastic modulus at 25° C. with respect to a light irradiation time. As for the light irradiation, exposure was performed using an LED lamp (manufactured by Panasonic Industrial Devices SUNX Co., Ltd., trade name: Aicure UJ30/ANUJ6186 and ANUJ6189) at a wavelength and an exposure dose as a first wavelength shown in Table 1. Thereafter, exposure was performed at a wavelength and an exposure dose as a second wavelength shown in Table 1. Table 1 shows storage elastic modulus results at 25° C. before light irradiation, after light irradiation at the first wavelength, and after light irradiation at the second wavelength.

TABLE 1

| Item | | | Example 1 | Example 2 | Comparative Example 1 |
|---|---|---|---|---|---|
| (A-1) Disulfide bond-containing dithiol compound | | LP-55 | 81.29 | 86.45 | 86.45 |
| (A-2) Ethylenically unsaturated group-containing compound | | Diallyl phthalate | 4.47 | — | — |
| | | Triethylene glycol divinyl ether | — | 4.75 | 4.75 |
| (B-1) Hydrogen abstraction type photoradical generator | | Fluorenone | 8.58 | — | — |
| | | Benzil | — | 4.94 | 4.94 |
| (B-2) Intramolecular cleavage type photoradical generator | | Omnirad 651 | 3.63 | — | — |
| | | Omnirad 1173 | — | 3.86 | — |
| Exposure step | First wavelength | 405 nm LED (J/cm$^2$) | 20 | 100 | 100 |
| | Second wavelength | 365 nm LED (J/cm$^2$) | 5 | 30 | 50 |
| Storage elastic modulus | Before light irradiation | (Pa) | 0.2 | 0.4 | 0.5 |
| | After light irradiation at first wavelength | (Pa) | 7500 | 229000 | 233000 |
| | After light irradiation at second wavelength | (Pa) | 7.8 | 5.3 | 225000 |

As shown in Table 1, it was shown that in the photocurable composition containing a dithiol compound having a disulfide bond, a compound having two ethylenically unsaturated groups, a hydrogen abstraction type photoradical generator, and an intramolecular cleavage type photoradical generator, a cured product that is fusible by light irradiation can be formed.

The invention claimed is:

1. A photocurable composition comprising:

a dithiol compound having a disulfide bond;

a compound having two ethylenically unsaturated groups;

a hydrogen abstraction type photoradical generator; and an intramolecular cleavage type photoradical generator, wherein the compound having two ethylenically unsaturated groups is a compound having two allyl groups or a compound having two vinyloxy groups.

2. The photocurable composition according to claim 1, wherein the hydrogen abstraction type photoradical generator has an absorption coefficient at a wavelength of 405 nm of 7 or more, and the intramolecular cleavage type photoradical generator has an absorption coefficient at a wavelength of 405 nm of 5 or less and an absorption coefficient at a wavelength of 365 nm of 49 or more.

3. The photocurable composition according to claim 1, wherein the hydrogen abstraction type photoradical generator includes at least one selected from the group consisting of fluorenone and benzil.

4. The photocurable composition according to claim 1, wherein the intramolecular cleavage type photoradical generator includes one selected from the group consisting of 2,2-dimethoxy-1,2-diphenylethan-1-one and 2-hydroxy-2-methyl-1-phenylpropanone.

5. The photocurable composition according to claim 1, wherein the photocurable composition is used for an adhesive.

6. A cured product of the photocurable composition according to claim 1.

7. A photofusible resin composition comprising:

a reaction product of a dithiol compound having a disulfide bond and a compound having two ethylenically unsaturated groups; and an intramolecular cleavage type photoradical generator, wherein the compound having two ethylenically unsaturated groups is a compound having two allyl groups or a compound having two vinyloxy groups.

8. An adhesive set comprising:

a first component containing a dithiol compound having a disulfide bond;

a second component containing a compound having two ethylenically unsaturated groups, wherein at least one of the first component and the second component further contains a hydrogen abstraction type photoradical generator, and at least one of the first component and the second component further contains an intramolecular cleavage type photoradical generator, wherein the compound having two ethylenically unsaturated groups is a compound having two allyl groups or a compound having two vinyloxy groups.

9. The photocurable composition according to claim 1, wherein the compound having two ethylenically unsaturated groups is a compound having two allyl groups.

10. The photocurable composition according to claim 1, wherein the compound having two ethylenically unsaturated groups is a compound having two vinyloxy groups.

11. The photofusible resin composition according to claim 7, wherein the compound having two ethylenically unsaturated groups is a compound having two allyl groups.

12. The photofusible resin composition according to claim 7, wherein the compound having two ethylenically unsaturated groups is a compound having two vinyloxy groups.

13. The adhesive set according to claim 8, wherein the compound having two ethylenically unsaturated groups is a compound having two allyl groups.

14. The adhesive set according to claim 8, wherein the compound having two ethylenically unsaturated groups is a compound having two vinyloxy groups.

* * * * *